(12) United States Patent
Martinchek et al.

(10) Patent No.: US 9,728,790 B2
(45) Date of Patent: Aug. 8, 2017

(54) FUEL CELL STACK BUS BAR ASSEMBLY SYSTEMS AND METHODS

(71) Applicant: GM GLOBAL TECHNOLOGY OPERATIONS LLC, Detroit, MI (US)

(72) Inventors: David A. Martinchek, Spencerport, NY (US); David A. Southwick, Lakewood, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 209 days.

(21) Appl. No.: 14/049,960

(22) Filed: Oct. 9, 2013

(65) Prior Publication Data
US 2015/0099213 A1     Apr. 9, 2015

(51) Int. Cl.
*H01M 8/0267* (2016.01)
*B60L 11/18* (2006.01)
*H01M 8/0258* (2016.01)
*H01M 8/2484* (2016.01)

(52) U.S. Cl.
CPC ....... *H01M 8/0267* (2013.01); *B60L 11/1883* (2013.01); *B60L 11/1887* (2013.01); *B60L 11/1892* (2013.01); *B60L 11/1898* (2013.01); *H01M 8/0258* (2013.01); *H01M 8/2484* (2016.02); *H01M 2250/20* (2013.01); *Y02T 90/32* (2013.01); *Y02T 90/34* (2013.01)

(58) Field of Classification Search
CPC .... H01M 8/02; H01M 8/0258; H01M 8/0267; H01M 8/2484; B60L 11/18; B60L 11/1883; B60L 11/1887; B60L 11/1892; B60L 11/1898
See application file for complete search history.

(56) References Cited

U.S. PATENT DOCUMENTS

2002/0187382 A1* 12/2002 Nishiumi ................. B60K 1/04
                                                                429/434
2006/0228615 A1* 10/2006 Armstrong et al. ............ 429/38

FOREIGN PATENT DOCUMENTS

CN         101043971 A      9/2007

OTHER PUBLICATIONS

CN101043971A—Machine Translation of Application.

* cited by examiner

*Primary Examiner* — Patrick Ryan
*Assistant Examiner* — Kiran Akhtar
(74) *Attorney, Agent, or Firm* — Phillips Ryther & Winchester; John P. Davis

(57) ABSTRACT

Systems and methods are disclosing providing for a fuel cell ("FC") stack assembly utilizing bus bars that accommodate for variations in FC stack heights during assembly. In some embodiments, bus bars consistent with embodiments disclosed herein may be integrally formed with terminal plates out of a single piece of conductive material. Further embodiments of the bus bars disclosed herein may include structures configured to facilitating cooling of the bus bars during operation of the FC system.

15 Claims, 11 Drawing Sheets

FUEL CELL STACK BUS BAR ASSEMBLY SYSTEMS AND METHODS

TECHNICAL FIELD

This disclosure relates to fuel cell systems. More specifically, but not exclusively, this disclosure relates to a fuel cell stack assembly including cooled bus bars that allow for variations in fuel cell stack heights during assembly.

BACKGROUND

Passenger vehicles may include fuel cell ("FC") systems to power certain features of a vehicle's electrical and drivetrain systems. For example, an FC system may be utilized in a vehicle to power electric drivetrain components of the vehicle directly (e.g., electric drive motors and the like) and/or via an intermediate battery system. An FC system may include a single cell or, alternatively, may include multiple cells arranged in a stack configuration.

FC systems may include one or more bus bars configured to electrically couple the FC system with one or more other vehicle systems. Conventional bus bars designs may utilize a significant amount of expensive conductive material. Further, during operation of an FC system, bus bars may become undesirably hot. Additionally, conventional bus bars designs may not be well suited to account for variations in FC stack height during assembly due to dimensional variations in constituent FC stack components.

SUMMARY

Systems and methods disclosed herein provide for an FC stack assembly utilizing bus bars that accommodate for variations in FC stack heights during assembly. In some embodiments, bus bars consistent with embodiments disclosed herein may incorporate a geometry that reduces an amount of conductive material during manufacture. For example, in certain embodiments, bus bars and associated FC terminal plates may be integrally formed components. Further embodiments of the bus bars disclosed herein may have structures configured to facilitating cooling of the bus bars during operation of the FC system.

In some embodiments, a FC system may include a dry end assembly associated with a dry end of the FC system and a wet end assembly associated with a wet end of the FC system. As used herein, a wet end may refer to an end of an FC system through which reactants and/or coolants pass through to enter and/or exit an FC stack assembly. In certain embodiments, the FC system may be configured to power an electric motor of a vehicle drivetrain system. The dry end assembly may include a first terminal plate coupled to an integrally formed first bus bar. A first insulator plate may be configured to receive and secure the first terminal plate and the first bus bar. A first end plate may be configured to receive and secure the first insulator plate.

The wet end assembly of the FC system may include a second terminal plate coupled to an integrally formed second bus bar. The second insulator plate may be configured to receive and secure the second terminal plate and the second bus bar. A second end plate may be configured to receive and secure the second insulator plate. In certain embodiments, the second bus bar may include one or more channels configured to align with one or more channels of the second insulator plate configured to facilitate flow of cathode reactant, anode reactant, and/or coolant through the channels. In certain embodiments, such flow may function to cool the second bus bar and/or second terminal plate.

In further embodiments, a method for assembling wet end assembly of a fuel cell system may include securing a terminal plate and an integrally formed bus bar within an insulator plate. A channel of the bus bar may be aligned with a channel of the insulator plate configured to facilitate flow of cathode reactant, anode reactant, and/or coolant through the fuel cell system. The insulator plate may then be secured against an end plate.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
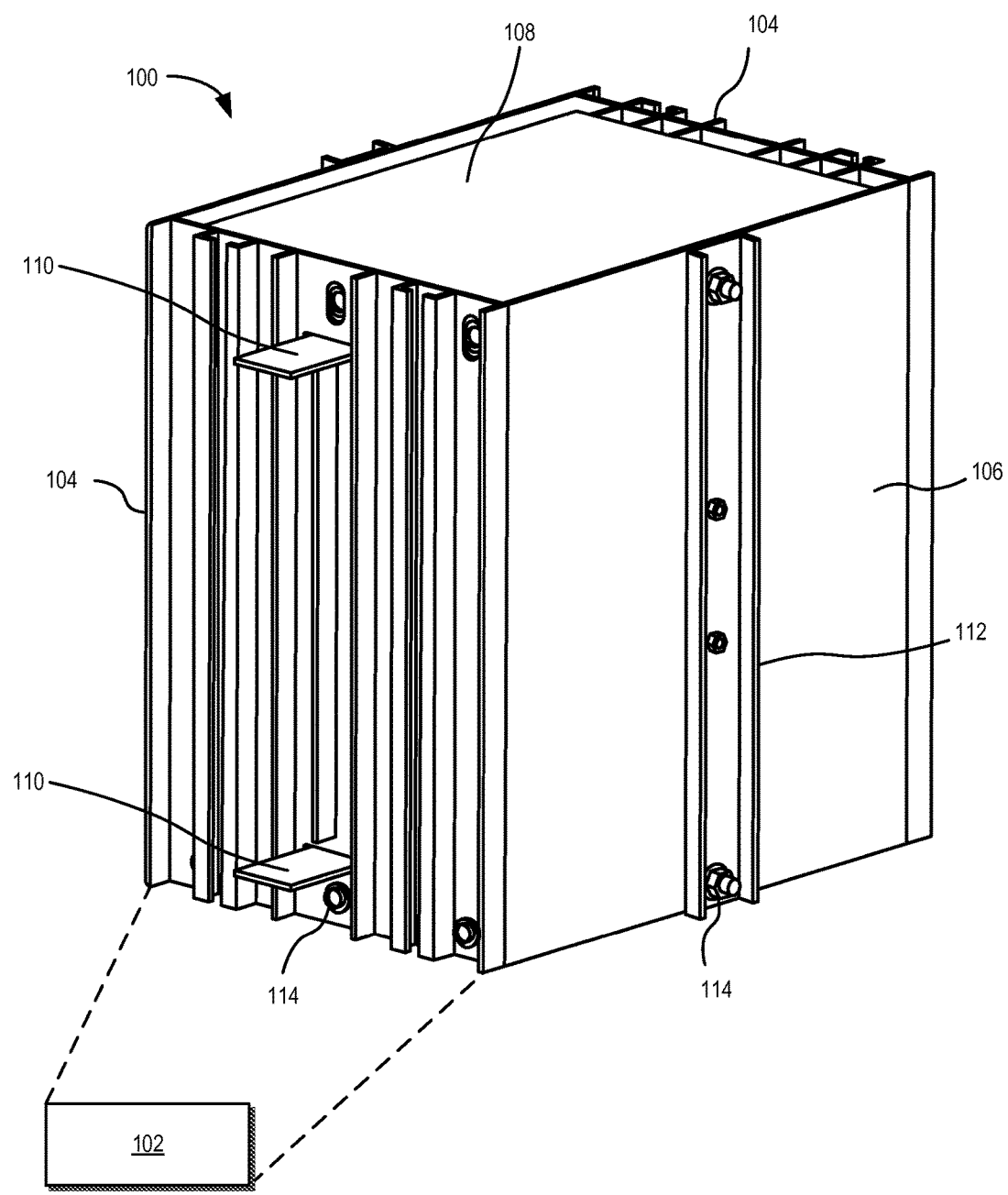
FIG. 1 illustrates a perspective view of an FC stack assembly consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein provide for a bus bar assembly for use in connection with an FC system. Certain embodiments may be utilized in conjunction with a proton exchange membrane ("PEM") FC system, although other types or FC systems may also be utilized. In a PEM-type FC, hydrogen may be supplied to an anode of the FC, and oxygen may be supplied as an oxidant to a cathode of the FC. A PEM FC may include a membrane electrode assembly ("MEA") including a proton transmissive non-electrical conductive solid polymer electrolyte membrane having an anode catalyst on one of its faces and a cathode catalyst on the opposite face. The MEA may be disposed between a pair of electrically conductive elements serving as current collectors for the anode and cathode and including one/or more channels and/or openings for distributing the gaseous reactants over the surfaces of the respective anode and cathode catalysts.

An FC system may include a single cell or, alternatively, may include multiple cells arranged in a stack configuration. For example, in certain embodiments, multiple cells may be arranged in series to form an FC stack. In an FC stack, a plurality of cells may be stacked together in electrical series and be separated by a gas impermeable, electrically conductive FC plate. The FC plate may perform a variety of functions and be configured in a variety of ways. In certain embodiments, the FC plate may define one or more internal cooling passages and/or channels including one or more heat exchange surfaces through which a coolant may flow to remove heat from the FC stack generated during its operation.

Electrical current generated by the FC system during operation may be collected in each electrically conductive FC plate. The current may then be transmitted through the stacks, via the FC plates, to terminal plates disposed at either end of the FC stack. Each terminal plate may be electrically coupled with a bus bar configured to operate as current collecting element. The bus bars may in turn be electrically coupled to and/or included in a stack interface unit ("SIU") configured to provide electrical power to various systems and/or components. Embodiments of the systems and methods disclosed herein may utilize a FC stack bus bar design that may, among other things, accommodate variations in FC stack height during assembly, utilize less potentially expensive conductive material, and allow for cooling of the bus bar during operation of the FC system (e.g., via integrated cooling channels and/or the like).

FIG. 1 illustrates a perspective view of a FC stack assembly 100 consistent with embodiments disclosed herein. The FC stack assembly 100 may, among other things, be configured to retain a FC system 102 included in a vehicle. The vehicle may be a motor vehicle, a marine vehicle, an aircraft, and/or any other type of vehicle, and may include any suitable type of drivetrain for incorporating the systems and methods disclosed herein. The FC system 102 may configured to provide electrical power to certain components of the vehicle collectively described herein as FC powered equipment ("FCPE"). For example, the FC system 102 may be configured to provide power to electric drivetrain components of the vehicle. The FC system 102 may include a single cell or multiple cells arranged in a stack configuration, and may include certain FC system elements and/or features described above.

In some embodiments, the FC stack assembly 100 may retain a FC system 102 and/or its consistent components in a particular position within in a vehicle and/or provide mechanical structural support for a battery system. In further embodiments, the FC stack assembly 100 may protect a battery system from forces, internal and external, experienced during normal vehicle operation (e.g., acceleration, deceleration, and/or vehicle impact forces).

Illustrated components of the FC stack assembly 100 may include, among other things, first side components 104, second side components 106, end plates 108, bus bars 110, and/or one or more structural members 112. When assembled, the components 104-112 may provide an assembly 100 configured to, among other things, retain and protect a FC system 102 included in the vehicle. For example, in certain embodiments, the illustrated assembly 100 may retain an enclosed FC system 102 in a particular position within a vehicle (e.g., by providing and/or facilitating mechanisms for securing the assembly 100 and/or the FC system 102 to a portion of the vehicle) and/or provide mechanical structural support for an FC system 102 contained therein. In further embodiments, certain components 104-112 may facilitate certain operating functionality of the FC system 102 including, for example, carrying generated current to FCPE (e.g., by bus bars 110), routing reactants through defined channels during operation of the FC system 102, and/or the like. Certain illustrated components 104-112 are described in more detail below in reference to FIGS. 2-10.

In some embodiments, the illustrated components 104-112 may be formed of a variety of suitable materials including, for example, plastic, ceramic, metal, epoxy, polymeric material and/or any combination thereof. For example, bus bars 110 may be comprised of a conductive metal such as, for example, copper and/or the like. Certain other components (e.g., side components 104, 106 and/or end plates 108) may be comprised of an electrically isolative or insulative material such as, for example, plastic and/or polymeric materials. In certain embodiments, the components 104-112 may be comprised of materials that do not significantly degrade over time under the normal operation of the FC system 102 and/or the vehicle. The components 104-112 may further be comprised of a material that provides sufficient protection and/or structural integrity from forces occurring during the normal operation of the FC system 102 and/or the vehicle. Further, the components 104-112 may be designed to withstand forces resulting from vehicle collisions or impacts.

The illustrated components 104-112 may be constructed using a variety of suitable techniques. For example, in certain embodiments, one or more of the components 104-

112 may be manufactured using an injection molding process, metal stamping, extrusion molding (e.g., side components 104, 106 and/or end plates 108), cast molding, etc. In some embodiments, the components 104-112 may have thicknesses that are substantially similar. In further embodiments, the components 104-112 may have thicknesses that are variable. For example, the components 104-112 may include thicker portions configured to provide structural support for the assembly 100. In yet further embodiments, the components 104-112 (e.g., side components 104, 106 and/or end plates 108) may include one or more ridges and/or other suitable structures configured to increase the structural rigidity of the components 104-112. In some embodiments, the components 104-112 may include one or more interfacing structures configured to, among other things, facilitate alignment of the components 104-112 and/or provide structural support to the FC stack assembly 100.

In certain embodiments, components 104-112 may be secured using one or more suitable mechanical fasteners 114 (e.g., screws, bolts, frictional fit, and/or any other suitable type of fasteners). One or more structural members 112 may to secure one or more of components 104-110. For example, as illustrated, a structural member 112 may be utilized to interface with and secure the end plates 102 and/or side components 104, 106 of the FC stack assembly 100.

Figure 2:
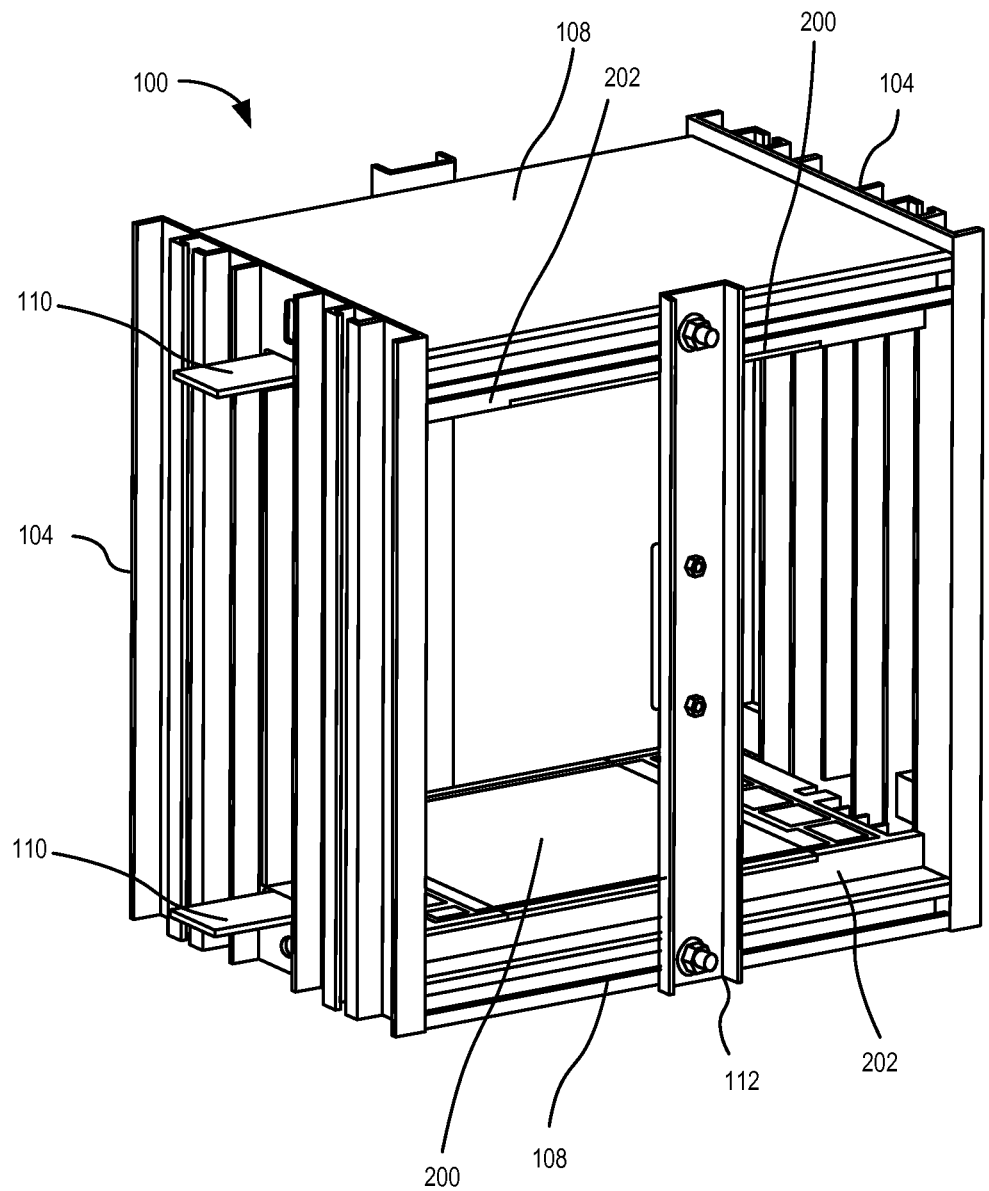
FIG. 2 illustrates another perspective view of an FC stack assembly consistent with embodiments disclosed herein.

FIG. 2 illustrates another perspective view of an FC stack assembly 100 with the second side components 106 removed consistent with embodiments disclosed herein. As illustrated, the FC stack assembly 100 may include terminal plates 200 disposed at each end of the FC stack. Current generated by the FC stack may be transmitted and/or collected by the terminal plates 200. In certain embodiments, the terminal plates 200 may be comprised of copper, although other suitable conductive materials may also be utilized.

Consistent with embodiments disclosed herein, the terminal plates 200 and the bus bars 110 may be formed of a single integral piece of conductive material. In certain embodiments, utilizing a single piece of conductive material for the terminal plate 200 and the bus bar 110 may reduce the collective amount of conductive material required to manufacture the components 110, 200 and bus bar 110. Utilizing a single piece of conductive material may further provide increased conductivity between the terminal plate 200 and the bus bar 110.

In certain embodiments, terminal plates 200 may interface with associated insulator plates 202 that may be configured to electrically insulate the terminal plate 200 from the end plates 108. The insulator plates 202 may be comprised of any suitable electrically insulative material. In some embodiments, the terminal plates 200 may be configured to interface with one or more areas, channels, and/or other suitable structures defined by the insulator plates 202. Among other things, this may allow the terminal plate 200 to interface and/or align with the insulator plate 202 in a desired position. The insulator plate 202 and the end plates 108 may similarly interface using one or more alignment structures.

Consistent with embodiments disclosed herein, the bus bars 110 may be configured to accommodate variations in the height of the FC stack assembly 100 due to manufacturing variations on its constituent components. For example, in some embodiments, the bus bars 110 may comprise a conductive material that allows the bus bars 110 to be bent and/or flexed in the vertical direction such the bus bars 110 may be positioned through associated openings included in at least one of the first side components 104. Utilizing a bus bar 110 material that allows the bus bars 110 to be bent and/or flexed to fit within associated openings in first side component 104 may ease assembly of the FC stack assembly 100.

Figure 3:
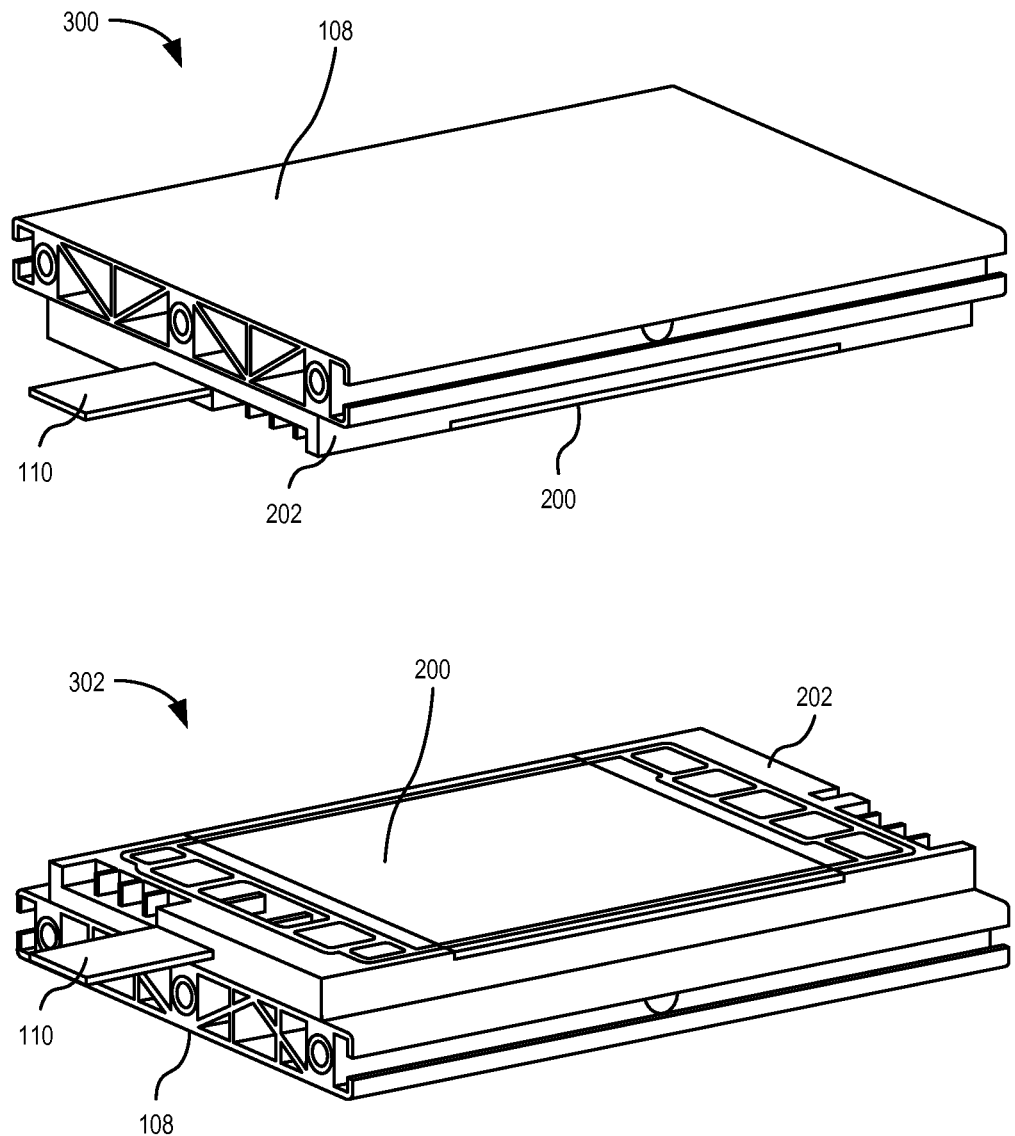
FIG. 3 illustrates a perspective view of insulator plates, end plates, terminal plates, and bus bars of dry and wet end assemblies of an FC stack assembly consistent with embodiments disclosed herein.

FIG. 3 illustrates a perspective view of dry and wet end assemblies 300, 302 of an FC stack assembly consistent with embodiments disclosed herein. As illustrated, the dry end assembly 300 may include an end plate 108, an insulator plate 202, a terminal plate 200, and/or a bus bar 110. Similarly, the wet end assembly 302 may also include an end plate 108, an insulator plate 202, a terminal plate 200, and/or a bus bar 110. Components of the dry end assembly 300 and wet end assembly 302 may be similar, but may also include certain structures configured to implement certain functionality specific to the respective end assemblies 300, 302. Elements of the dry end assembly 300 and wet end assembly 302 are described in more detail below in reference to FIGS. 4a-4c.

Figure 4A:
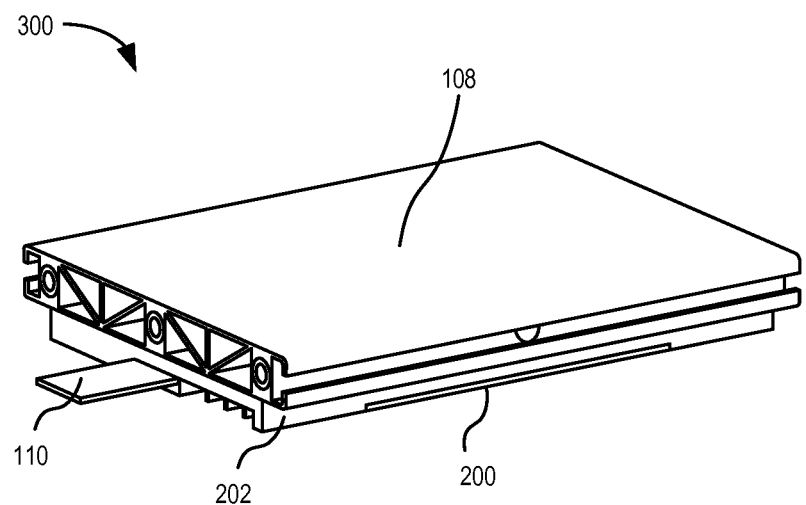
FIG. 4a illustrates a perspective view of an exemplary dry end assembly of an FC stack assembly consistent with embodiments disclosed herein.
Figure 4B:
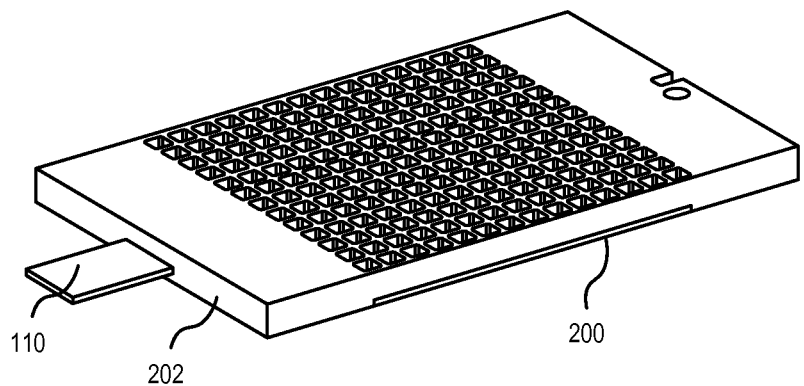
FIG. 4b illustrates a perspective view of an exemplary dry end assembly of an FC stack assembly with an end plate removed consistent with embodiments disclosed herein.
Figure 4C:
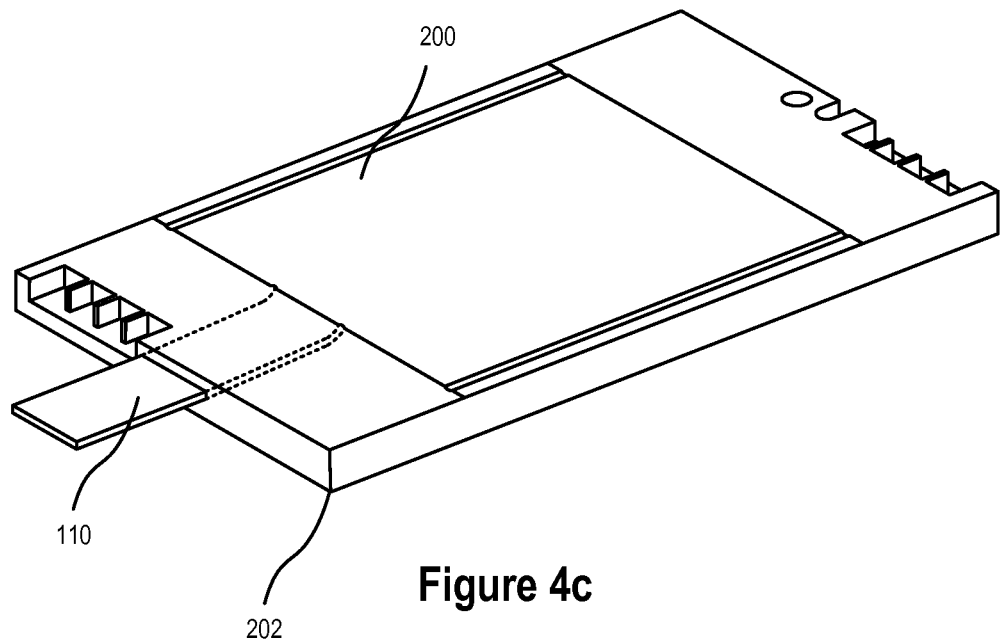
FIG. 4c illustrates another perspective view of an exemplary dry end assembly of an FC stack assembly with an end plate removed consistent with embodiments disclosed herein.

FIGS. 4a-4c illustrates perspective views of an exemplary dry end assembly 300 of an FC stack assembly consistent with embodiments disclosed herein. Particularly, FIG. 4a illustrates an end plate 108, insulator plate 202, terminal plate 200, and bus bar 110 of a dry end assembly 300. FIGS. 4b-4c illustrate the dry end assembly 300 with the end plate 108 removed.

In certain embodiments, the bus bar 110 may be routed external to the dry end assembly 300 via an opening in the insulator plate 202. Although not illustrated, in certain embodiments, the opening in the insulator plate 202 may be over-molded relative to the bus bar 110. In some embodiments, routing the bus bar 100 through the insulator plate 202 may securely couple the bus bar 110 and terminal plate 200 to the insulator plate 202 and prevent movement therebetween. In further embodiments, such routing may operate in conjunction with one or more other structures of the insulator plate 202 configured to securely retain the terminal plate 200 with the insulator plate 202.

The insulator plate 202 may include one or more other structures configured to provide various functions. For example, the insulator plate 202 may include structures configured to provide rigidity and/or structure to the components of the dry end assembly 300, structures and/or openings to facilitate cooling of the terminal plate 200 and/or other FC components (e.g., via circulating liquid and/or air), structures and/or openings to facilitate assembly of the FC stack assembly (e.g., securement and/or alignment structures), and/or the like.

Figure 4D:
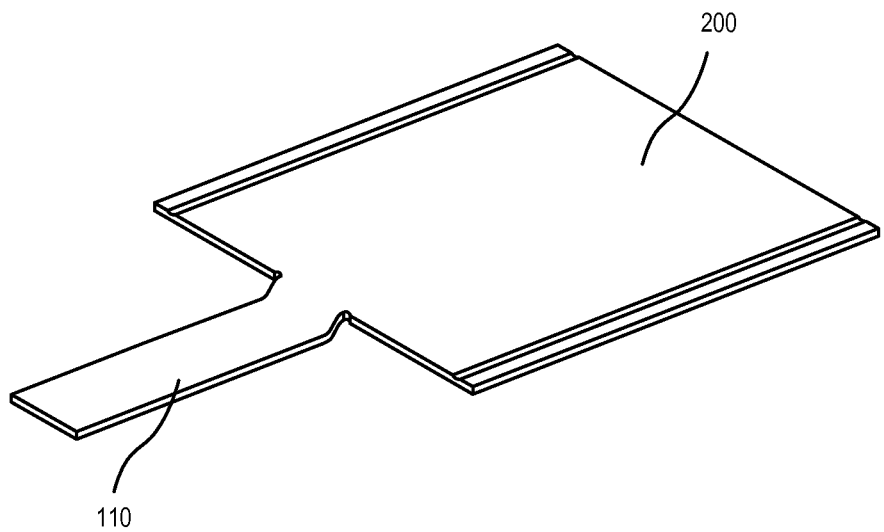
FIG. 4d illustrates a perspective view of a bus bar and terminal plate of an exemplary dry end assembly of an FC stack assembly consistent with embodiments disclosed herein

FIG. 4d illustrates a perspective view of a bus bar 110 and terminal plate 200 of an exemplary dry end assembly of an FC stack assembly consistent with embodiments disclosed herein. As illustrated, the terminal plate 200 and the bus bar 110 may be formed of a single integral piece of conductive material. In certain embodiments, utilizing a single piece of conductive material for the terminal plate 200 and the bus bar 110 may reduce the collective amount of conductive material required to manufacture the terminal plate 200 and bus bar 110, and may further provide increased electrical conductivity therebetween.

Figure 5A:
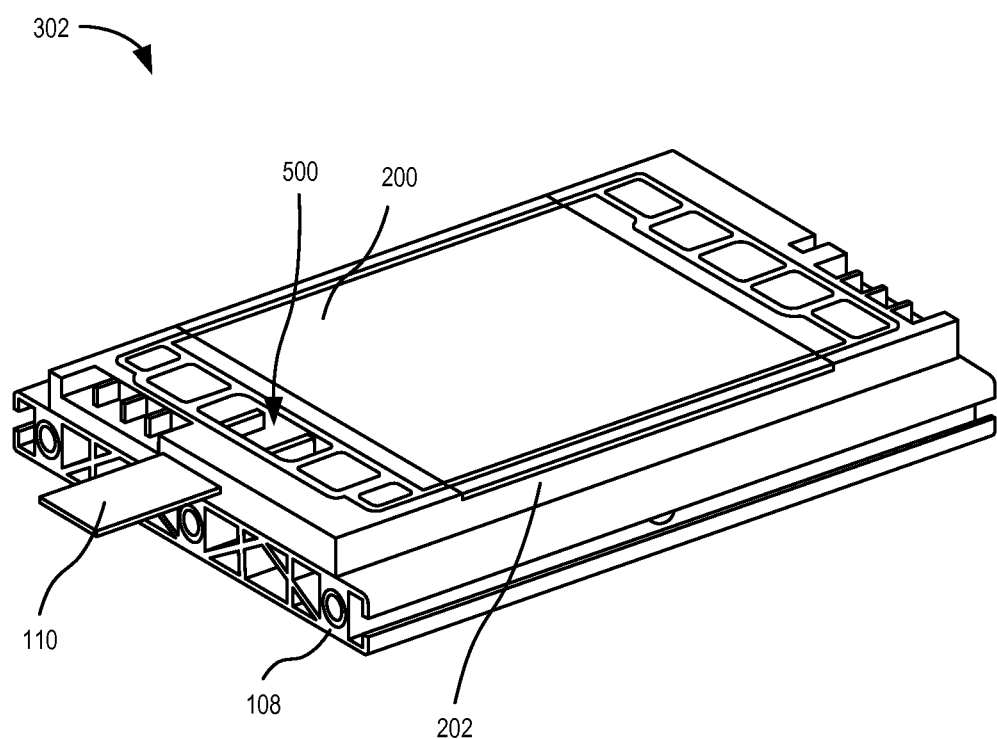
FIG. 5a illustrates a perspective view of a wet end assembly of an FC stack assembly consistent with embodiments disclosed herein.
Figure 5B:
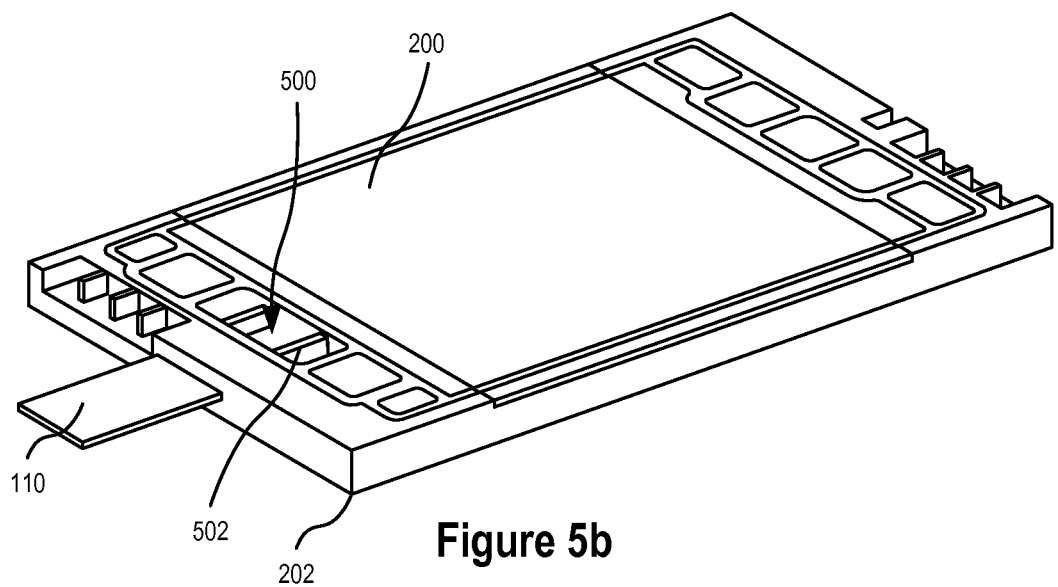
FIG. 5b illustrates a perspective view of an exemplary wet end assembly of an FC stack assembly with an end plate removed consistent with embodiments disclosed herein.
Figure 5C:
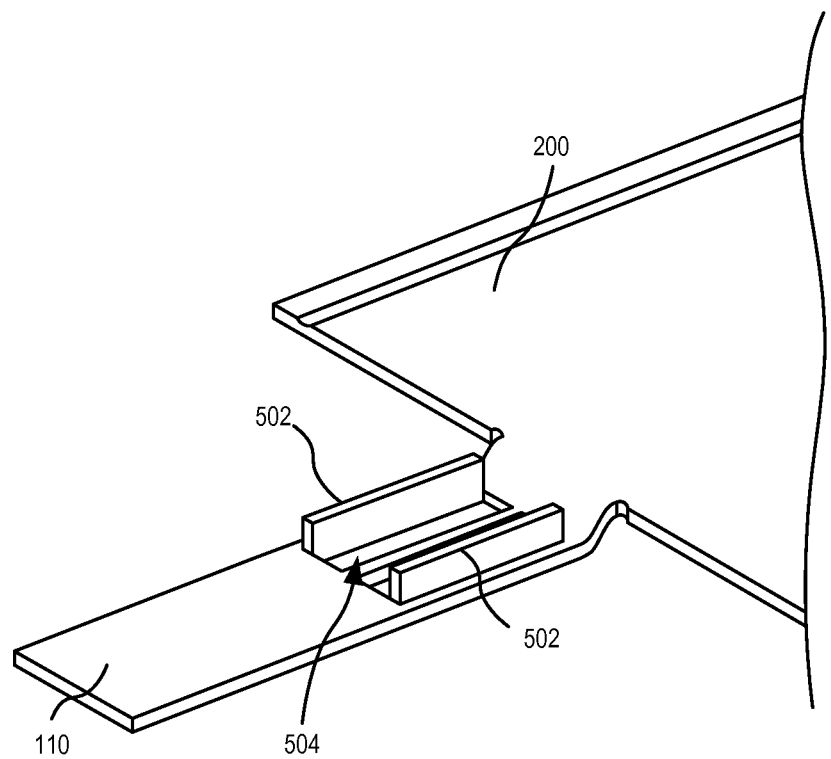
FIG. 5c illustrates a perspective view of a bus bar and terminal plate of an exemplary wet end assembly consistent with embodiments disclosed herein.

FIGS. 5a-5b illustrate a perspective view of an exemplary wet end assembly 302 of an FC stack assembly consistent with embodiments disclosed herein. Particularly, FIG. 5a illustrates an end plate 108, insulator plate 202, terminal plate 200, and bus bar 110 of a wet end assembly 302. FIG. 5b illustrates the wet end assembly 302 with the end plate 108 removed.

In certain embodiments, the bus bar 110 may be routed external to the end assembly 302 via an opening in the insulator plate 202. In certain embodiments, routing the bus bar 110 through the insulator plate 202 may securely couple the bus bar 110 and terminal plate 200 to the insulator plate 202 and prevent movement therebetween. In certain embodiments, such routing may operate in conjunction with one or more other structures of the insulator plate 202 configured to securely retain the terminal plate 200 to the insulator plate 202.

In certain embodiments, one or more channels 500 may be defined in the insulator plate 202 configured to facilitate cathode reactant, anode reactant, and/or coolant flow through the FC system. The insulator plate 202 may include additional structures configured to provide rigidity and/or structure to the components of the wet end assembly 302, structures and/or openings to facilitate cooling of the terminal plate 200 and/or other FC components (e.g., via circulating liquid and/or air), structures and/or openings to facilitate assembly of the FC stack assembly (e.g., securement and/or alignment structures), and/or the like.

In certain embodiments, when routed through the wet end assembly 302 via an opening in the insulator plate 202, the bus bar 110 may pass through the one or more channels 500 defined in the insulator plate 202 configured facilitate cathode reactant, anode reactant, and/or coolant flow through the FC system. For example, referring to FIGS. 5b-5c, a bus bar 110 may be include one or more channels 504 configured to allow the cathode reactant stream to pass through the bus bar 110 when channels 504 are aligned with channels 500 of the insulator plate 202. In certain embodiments, allowing the cathode reactant stream to pass through the bus bar 110 via channels 504 may cool the bus bar 110 during operation of the FC system.

In some embodiments, one or more cooling fins 502 may be included on the bus bar 110 proximate to the channels 504. The one or more cooling fins 502 may increase a surface area of the bus bar 110 in contact with the cathode reactant stream flowing through channels 504, thereby increasing cooling of the bus bar 110 provided by the cathode stream. In certain embodiments, utilizing cooling fins 502 to increase the surface area of the bus bar 110 in contact with the cathode reactant stream may further allow for a reduced bus bar 110 cross-sectional size proximate to the cathode reactant stream flow. In further embodiments, the cooling fins 502 may also reduce pressure drop of the cathode reactant stream caused by flow through channels 500 and/or 504.

In some embodiments, the insulator plate 202 may include one or more over-molded portions configured to separate the bus bar 110 from direct contact with reactant and/or coolant flow though the FC system via channels 500. While physically separating the bus bar 110 from direct contact with reactant and/or coolant flow, the over-molded portions may be configured to continue to facilitate thermal transfer between the bus bar 110 and the reactant(s) and/or coolant. In certain embodiments, separating the bus bar 110 from direct contact with reactant and/or coolant flow by a thermally conductive over-molded portion may reduce the likelihood of ionic contamination due to bare metal exposure in the reactant stream and/or potential leakage between the bus bar 110 and the insulator plate 202.

Figure 6:
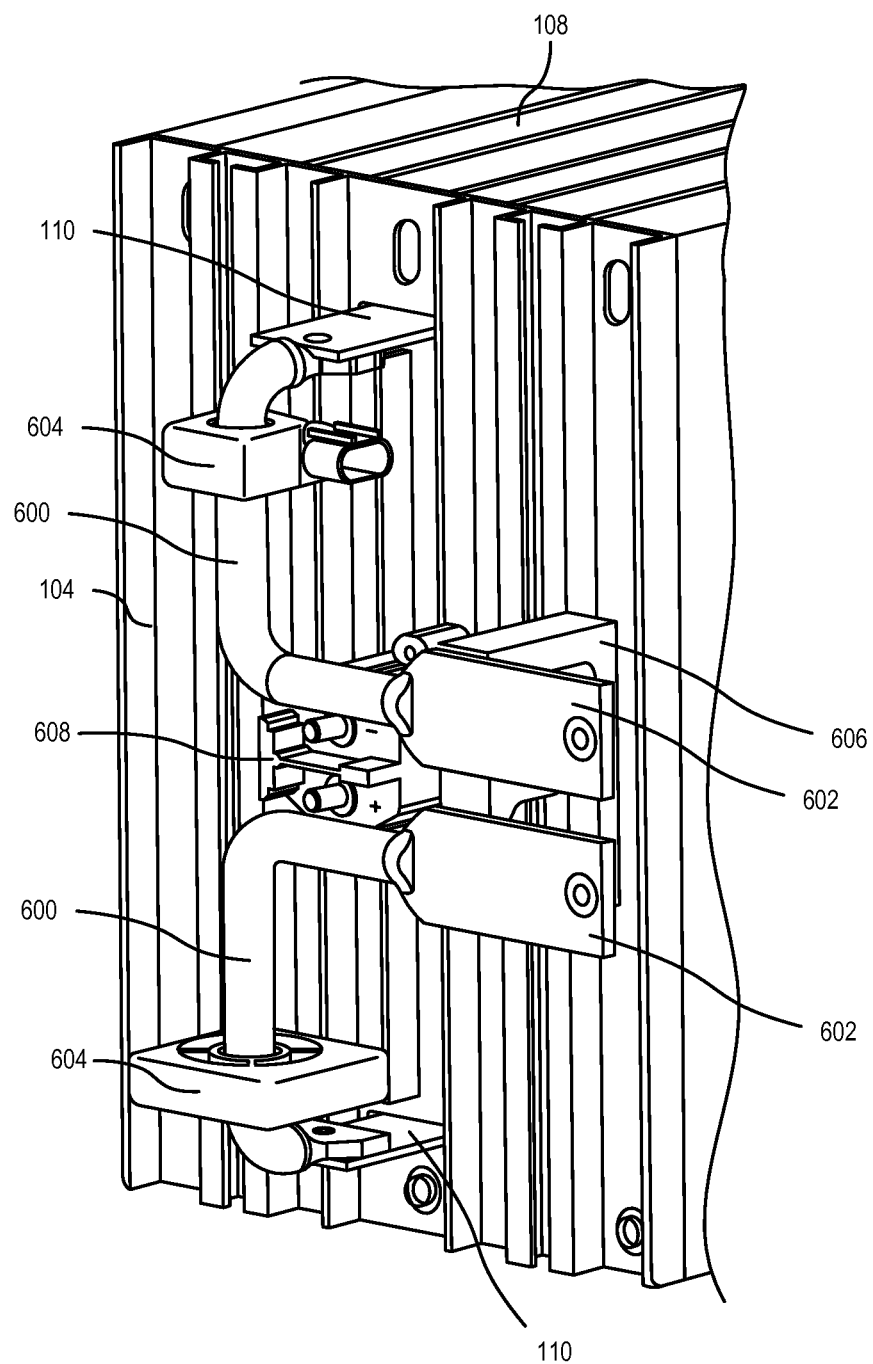
FIG. 6 illustrates a perspective view of an exemplary stack interface unit consistent with embodiments disclosed herein.
Figure 7:
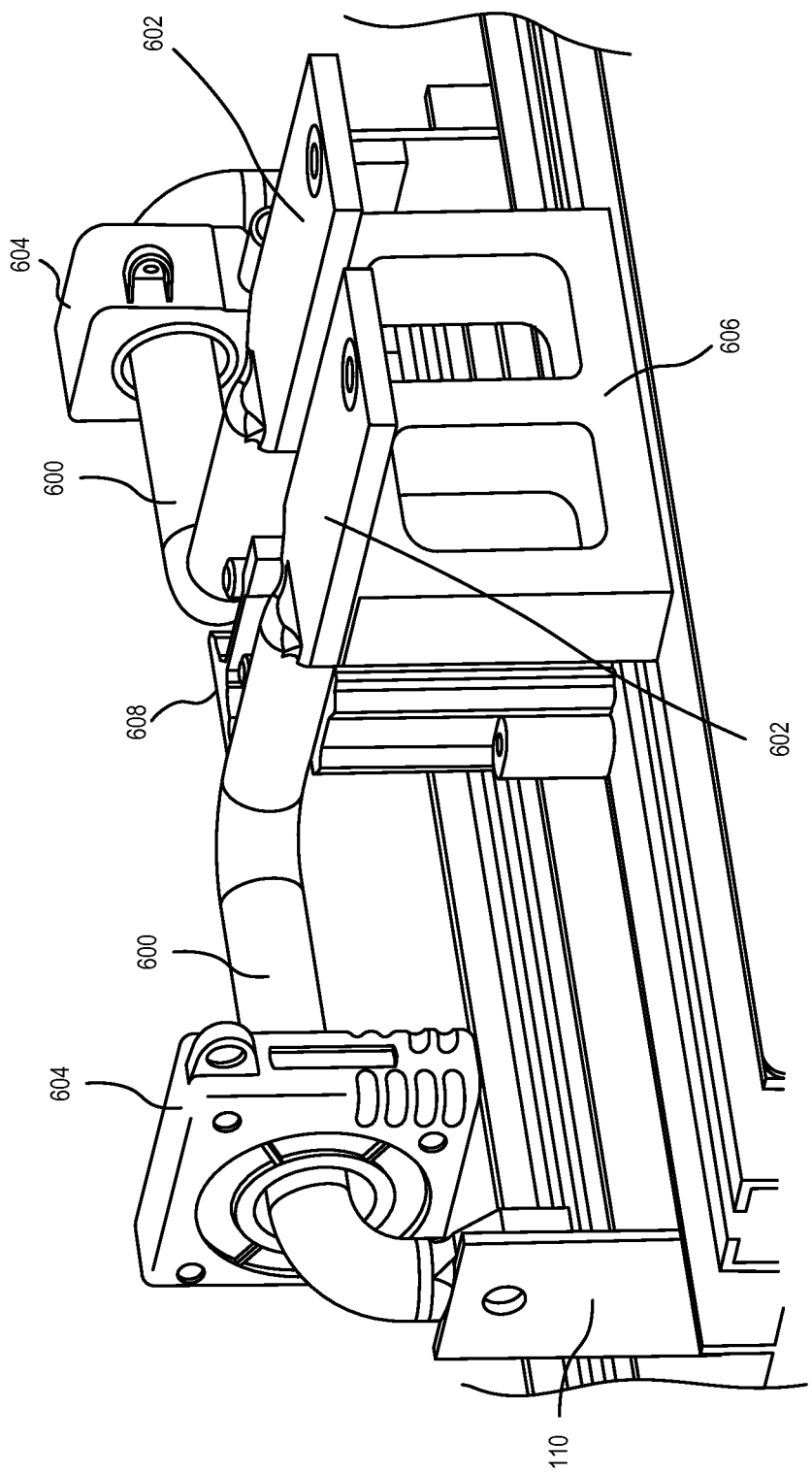
FIG. 7 illustrates a perspective view of an exemplary heat sink for use in connection with a stack interface unit consistent with embodiments disclosed herein.
Figure 8:
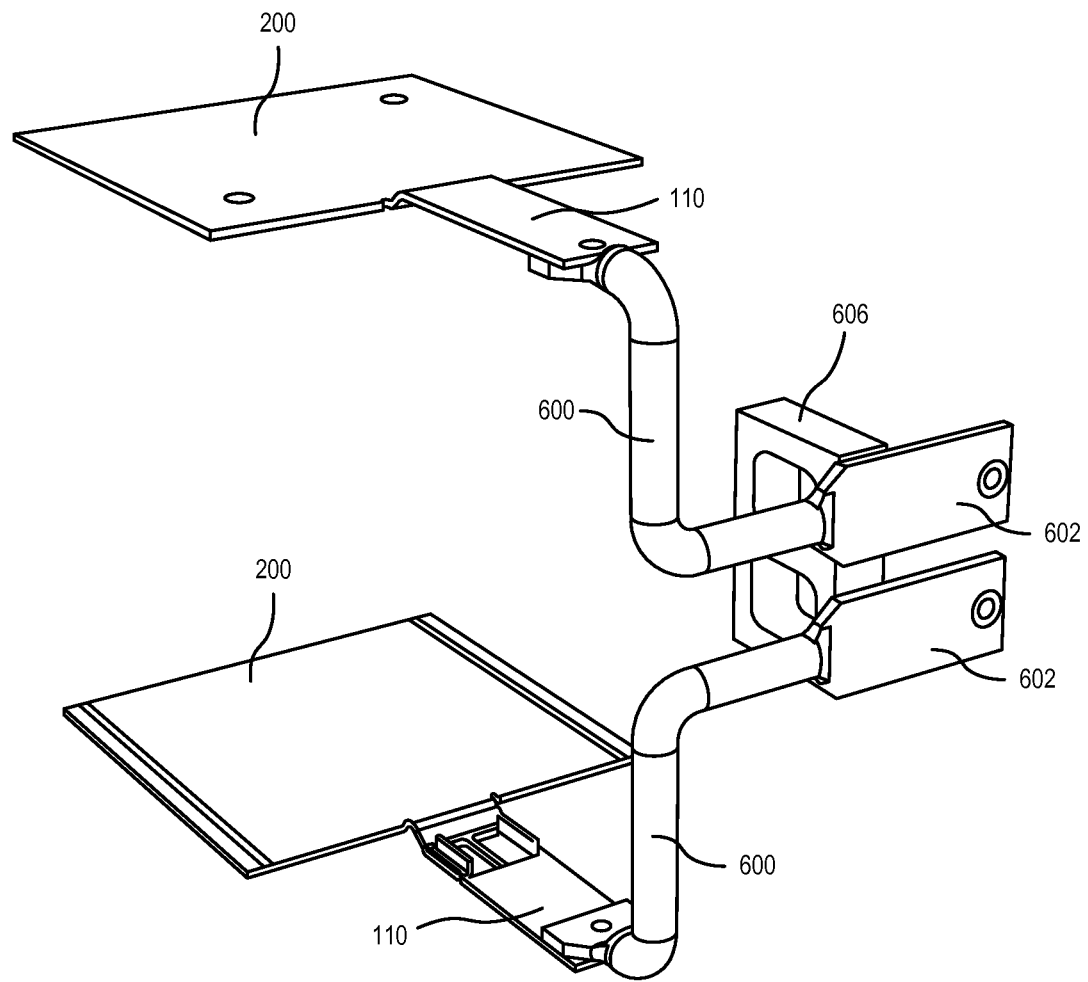
FIG. 8 illustrates a perspective view of an exemplary stack interface unit of an FC stack assembly consistent with embodiments disclosed herein.

FIGS. 6-8 illustrate perspective views of an exemplary SIU consistent with embodiments disclosed herein. The SIU by be configured to electrically coupled the FC system to various FCPE. As illustrated, the SIU may include, among other things, bus bars 110, round bus bars 600, and/or FCPE interfaces 602. Round bus bars 600 and/or the FCPE interfaces 602 may be comprised of a conductive metal such as, for example, copper. In some embodiments, round bus bars 600 and/or the FCPE interfaces 602 may be comprised of the same or similar material as bus bars 110. Bus bars 110, round bus bars 600, and/or the FCPE interfaces 602 may be configured to electrically couple the FC system to various FCPE (e.g., electric vehicle drivetrains or the like)

Round bus bars 600 may be electrically coupled to bus bars 110 and FCPE interfaces 602. In certain embodiments, the round bus bars 600 and the FCPE interfaces 602 may comprise a single integral piece of conductive material. For example, in some embodiments, the FCPE interfaces 602 may be formed by stamping, crimping, and/or machining a terminal end of the round bus bars 600. In certain embodiments, utilizing a single piece of conductive material for the round bus bars 606 and FCPE interfaces 602 may reduce the collective amount of conductive material required to manufacture the respective components 600, 602. Utilizing a single piece of conductive material may further provide increased conductivity between the round bus bars 600 and the FCPE interfaces 602. Although illustrated and described herein as round bus bars 600, it will appreciated that any suitable bus bar geometry or geometries (e.g., square, rectangular, etc.) may also be utilized.

AC and/or DC current sensors 604 may be configured to measure a flow of electrical current through the round bus bars 600. In certain embodiments, information measured by the AC and/or DC current sensors 604 may be provided to a FC control system (not shown) and utilized in managing the operation of the FC system. In further embodiments, the SIU may include one or more contactors 608. The contactors 608 may comprise any type of switch that allows for the opening and closing of a circuit including the FC system. For example, in some embodiments, the contactors 608 may comprise mechanical switches configured to electrically couple the FC system (e.g., via an actuated saddle-wire connection or the like) to one or more power busses or pieces of FCPE. As illustrated, the contactor 608 may be configured to mount to a first side component 104 of the FC system assembly.

In certain embodiments, the SIU may further include a heat sink 606. The heat sink 606 may comprise a variety of thermally conductive materials including, for example, aluminum. In certain embodiments, the heat sink 606 may be configured to mount to the first side component 104 of the FC system assembly. The heat sink 606 may include one or more openings and/or structures configured increase the surface area of the heat sink 606 and its ability to dissipate heat. In certain embodiments, a gap pad (not shown) may be disposed between the round bus bars 600 and/or the FCPE interfaces 602 and the heat sink 606. For example, a 0.5 mm thick gap pad may be disposed between the FCPE interfaces 602 and the heat sink 606. In certain embodiments, the gap pad may comprise a suitable thermally conductive material.

Figure 9:
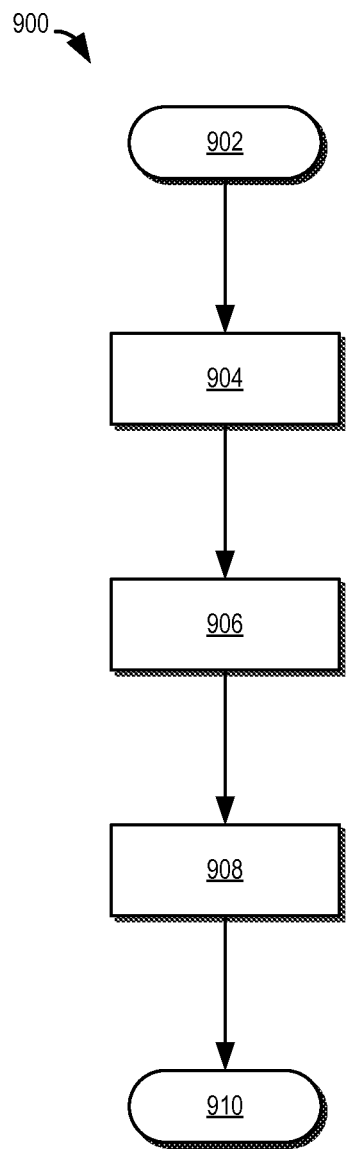
FIG. 9 illustrates a flow chart of an exemplary method of assembling an FC stack consistent with embodiments disclosed herein.

FIG. 9 illustrates a flow chart of an exemplary method 900 of assembling an FC stack consistent with embodiments disclosed herein. Particularly, method 900 may be used to assemble a wet end assembly of a fuel cell system. At 902, the method 900 may be initiated. At 904, a terminal plate and an integrally formed bus bar may be secured within an insulator plate. In certain embodiments, securing the terminal plate and bus bar with the insulator plate may comprise inserting the bus bar and/or a portion of the terminal plate through at least one opening included in the insulator plate configured to receive the bus bar and/or portion of the terminal plate.

The bus bar may include one or more channels. The insulator plate may further include one or more channels configured to facilities the flow of cathode reactant through the insulator plate channels. At 906, the channel of the bus bar may be aligned with the channel of the insulator plate such that cathode reactant may flow through both the bus bar and insulator plate channels during operation of the fuel cell system. At 908, the insulator plate may be secured against an end plate. At 910, the method 900 may terminate.

Although the foregoing has been described in some detail for purposes of clarity, it will be apparent that certain changes and modifications may be made without departing from the principles thereof. For example, in certain embodiments, the systems and methods disclosed herein may be utilized in connection with battery systems not included in a vehicle. Further, the systems and methods disclosed herein may be utilized to provide enclosure for a variety of other systems including, for example, fuel cell systems. It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection. Those having skill in the art will appreciate that many changes may be made to the details of the above-described embodiments without departing from the underlying principles of the invention. The scope of the present invention should, therefore, be determined only by the following claims.

The invention claimed is:

1. A fuel cell system comprising:
 a dry end assembly associated with a dry end of the fuel cell system comprising:
  a first terminal plate coupled to an integrally formed first bus bar, the first bus bar being configured to bend in a first direction relative to the first terminal plate to accommodate variations in a stack height of the fuel cell system;
  a first insulator plate configured to receive and secure the first terminal plate and first bus bar; and
  a first end plate configured to receive and secure the first insulator plate; and
 a wet end assembly associated with a wet end of the fuel cell system comprising:
  a second terminal plate coupled to an integrally formed second bus bar, the second bus bar being configured to bend in a second direction relative to the second terminal plate to accommodate variations in the stack height of the fuel cell system;
  a second insulator plate configured to receive and secure the second terminal plate and second bus bar, the second insulator plate comprising at least one channel configured to facilitate cathode reactant flow during operation of the fuel cell system; and
  a second end plate configured to receive and secure the second insulator plate.

2. The fuel cell system of claim 1, wherein the first terminal plate and the first bus bar are integrally formed of a single piece of conductive material.

3. The fuel cell system of claim 1, wherein the second terminal plate and the second bus bar are integrally formed of a single piece of conductive material.

4. The fuel cell system of claim 1, wherein the second bus bar comprises at least one channel configured to align with the at least one channel of the second insulator plate and facilitate cathode reactant flow during operation of the fuel cell system.

5. The fuel cell system of claim 4, wherein the at least one channel of the second bus bar is configured to facilitate the transfer of thermal energy between the second bus bar and cathode reactant.

6. The fuel cell system of claim 4, wherein second bus bar further comprises one or more cooling fins configured to facilitate the transfer of thermal energy between the second bus bar and cathode reactant.

7. The fuel cell system of claim 1, wherein the first and second insulator plates are configured to electrically isolate the first and second terminal plates from the first and second end plates respectively.

8. A powertrain system configured to propel a vehicle comprising:
 an electric motor configured to propel the vehicle;
 a fuel cell system in electrical communication with the motor, the fuel cell system comprising:
  a dry end assembly associated with a dry end of the fuel cell system comprising:
   a first terminal plate coupled to an integrally formed first bus bar, the first bus bar being configured to bend in a first direction relative to the first terminal plate to accommodate variations in a stack height of the fuel cell system,
   a first insulator plate configured to receive and secure the first terminal plate and first bus bar, and
   a first end plate configured to receive and secure the first insulator plate; and
  a wet end assembly associated with a wet end of the fuel cell system comprising:
   a second terminal plate coupled to an integrally formed second bus bar, the second bus bar being configured to bend in a second direction relative to the second terminal plate to accommodate variations in the stack height of the fuel cell system, a second insulator plate configured to receive and secure the second terminal plate and second bus bar, the second insulator plate comprising at least one channel configured to facilitate cathode reactant flow during operation of the fuel cell system, and a second end plate configured to receive and secure the second insulator plate.

9. The system of claim 8, wherein the first terminal plate and the first bus bar are integrally formed of a single piece of conductive material.

10. The system of claim 8, wherein the second terminal plate and the second bus bar are integrally formed of a single piece of conductive material.

11. The system of claim 8, wherein the second bus bar comprises at least one channel configured to align with the at least one channel of the second insulator plate and facilitate cathode reactant flow during operation of the fuel cell system.

12. The system of claim 11, wherein the at least one channel of the second bus bar is configured to facilitate the transfer of thermal energy between the second bus bar and cathode reactant.

13. The system of claim 11, wherein second bus bar further comprises one or more cooling fins configured to facilitate the transfer of thermal energy between the second bus bar and cathode reactant.

14. The system of claim 8, wherein the first and second insulator plates are configured to electrically isolate the first and second terminal plates from the first and second end plates respectively.

15. A method for assembling wet end assembly of a fuel cell system comprising:

securing a terminal plate and an integrally formed bus bar configured to bend in a direction relative to the terminal plate within an insulator plate through bending of the bus bar;

aligning a channel of the bus bar with a channel of the insulator plate configured to facilitate flow of cathode reactant through the fuel cell system; and securing the insulator plate against an end plate.

* * * * *